United States Patent Office.

ISAIAH L. ROBERTS, OF BROOKLYN, ASSIGNOR TO THE ROBERTS-BREVOORT ELECTRIC COMPANY, (LIMITED,) OF NEW YORK, N. Y.

DIAPHRAGM FOR GALVANIC BATTERIES.

SPECIFICATION forming part of Letters Patent No. 394,616, dated December 18, 1888.

Application filed May 28, 1887. Renewed October 27, 1888. Serial No. 289,340. (No specimens.)

*To all whom it may concern:*

Be it known that I, ISAIAH L. ROBERTS, a resident of the city of Brooklyn, county of Kings, and State of New York, and a citizen of the United States, have made a new and useful Improvement in Electric Batteries, of which the following is such a clear and exact description as will enable others skilled in the art to practice the same.

My invention relates to electric batteries wherein two fluids are kept apart by a separating partition or diaphragm, which prevents the physical mixing of the fluids as such, but which permits chemical action to take place between the fluids.

In an application for a patent filed by Henry L. Brevoort and myself jointly May 1, 1886, Serial No. 200,847, we have described and claimed a separating partition or diaphragm upon opposite sides of which the liquids of a two-cell battery can be placed, and through which diaphragm or separating-partition the liquids will not physically transfuse to an injurious extent in practice, although in and through the substance of the diaphragm chemical action may take place. The partition or diaphragm was formed partially or wholly of a gelatinous or jelly-like material, which makes a non-porous, substantially-solid, and homogeneous wall, whose particles, while sufficiently solid and compact to maintain their own position, and so prevent for practical purposes any transmission of fluid through them, are yet themselves able to act as electrolytes and suffer such decompositions and recombinations as are essential to the electrolytic transmission of electric force.

My present invention consists in so treating saponified substances that they form some kind of a jelly or gelatinous mass which is insoluble in the fluids used in the battery. The substance thus formed may be used alone or in combination with preferably a suitable holder or support, the material preventing physical commingling of the battery-fluids, but not preventing chemical action from taking place through the material and between the separated fluids.

In the practice of my invention I proceed as follows: In, say, six pounds of water, preferably hot, I dissolve, say, four pounds of bar-soap, and while the water is still hot I plunge into it an ordinary earthenware porous cup preferably. A felt bag or a piece of closely-fulled felt will answer my purpose; but I prefer a porous cup made very porous— such a cup, for instance, as is illustrated and described in my application, Serial No. 237,259. I leave the cup or other holder in the solution till no more air will come out of it, which can be told by the bubbles. This will require from half an hour to two hours, more or less. I then take my holder from the solution and plunge it into a bath of, preferably, muriatic acid, though other acids or salts— such as bichromate of soda or potash or sal-ammoniac—can be used. A weak or strong solution of the acid can be used. If weaker, the soaking must be longer; if stronger, a shorter period of treatment will suffice. With muriatic acid 20° Baumé half an hour's soaking will suffice for an ordinary porous cup, though I prefer a longer period. With the salts a saturated solution, or at least a strong solution, is to be preferred.

Referring to the acid used, any acid will do which will unite with the alkaline base of the saponified material, and any substance will do for a soap which can be saponified. Any salt may be used that will cause the precipitation of the soap. I may mix with the saponifiable mass or with the saponified substance such substances as paraffine, rosin, and the gums generally. Such substances as seem to combine with the saponified or saponifiable mass, as does paraffine, will do to mix with the soap either before or after saponification, and I find them advantageous. I find that it is advantageous to mix with the solution of soap silicate of soda, which can be dissolved in the water used to dissolve the soap. Any desired quantity can be so used, and the proportions can be so used to suit the desires of the person making the mixture. The silicate of soda is useful in making the resulting mass more glutinous. I do not, however, wish to claim in this case the use of silicate of soda separately for making these partitions, as that is set forth in my application, No. 237,259. After the saturated holder has been treated, as before described, in an acid, it is ready for use as a separating partition or diaphragm in an electric battery to separate two liquids. These liquids may be sesquichloride of iron on one side and table-salt dissolved in water on the other. Acids can be used on one side of the separating-partition, if desired. The holder being saturated with the soap, my theory of the action of the acid is as follows: It precipitates in the pores of the holder stearic acid and the resins or gums used in the soap in a gelatinous or jelly-like mass, which gives to the holder the capacity of keeping the fluids physically separated in the battery, while it permits chemical action to take place through the partition. The foregoing is, I believe, true of any of the salts which will unite with the alkaline base of the soap. With those salts which do not unite with the alkaline base of the soap then the soap itself is precipitated in a gelatinous mass not soluble.

The holder may be saturated with the saponified material, and its final treatment with an acid or a salt may be accomplished by the battery-fluids themselves after the partition, cup, or diaphragm has been placed in the battery itself. I believe that I am the first person to use a saponified material treated as before described to make it insoluble as a material to keep apart the two fluids of an electric battery, and I am the first to discover that such a substance as is here described has the peculiar properties referred to in this specification. I can take stearic acid and rub it into the pores or interstices of a suitable holder and treat it with an acid or salt, as above described, and obtain a useful result.

What I claim, and desire to secure by Letters Patent, is—

1. A separating partition or diaphragm for an electric battery, composed partially or wholly of a gelatinous or jelly-like substance made of insoluble saponified material.

2. A separating partition or diaphragm for an electric battery, composed of a porous substance impregnated with insoluble saponified material.

3. A separating partition or diaphragm for an electric battery, composed of earthenware having its pores closed with insoluble saponified material.

4. A separating partition or diaphragm for an electric battery, composed of earthenware having its pores closed with insoluble saponified material containing silicate of soda.

ISAIAH L. ROBERTS.

Witnesses:
B. T. VETTERLEIN,
M. E. STODDARD.